(12) United States Patent
Wallace

(10) Patent No.: US 10,065,859 B2
(45) Date of Patent: Sep. 4, 2018

(54) HYDROCHLORIC ACID PRODUCTION SYSTEM

(71) Applicant: Enviro Water Minerals Company, Inc., Houston, TX (US)

(72) Inventor: Paul Steven Wallace, Katy, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 725 days.

(21) Appl. No.: 14/263,558

(22) Filed: Apr. 28, 2014

(65) Prior Publication Data

US 2014/0319040 A1   Oct. 30, 2014

Related U.S. Application Data

(60) Provisional application No. 61/817,076, filed on Apr. 29, 2013.

(51) Int. Cl.

| | |
|---|---|
| *C01B 7/01* | (2006.01) |
| *C01B 7/07* | (2006.01) |
| *C02F 9/00* | (2006.01) |
| *C02F 1/44* | (2006.01) |
| *C02F 1/04* | (2006.01) |

(Continued)

(52) U.S. Cl.
CPC ............ *C01B 7/0706* (2013.01); *C02F 1/048* (2013.01); *C02F 9/00* (2013.01); *B01D 1/28* (2013.01); *C02F 1/041* (2013.01); *C02F 1/441* (2013.01); *C02F 1/4693* (2013.01); *C02F 2001/5218* (2013.01); *C02F 2103/08* (2013.01)

(58) Field of Classification Search
None
See application file for complete search history.

(56) References Cited

U.S. PATENT DOCUMENTS 3,315,440 A * 4/1967 Alkemade ............... C01B 7/01
203/12
4,113,786 A * 9/1978 Tsao ....................... C07C 17/38
423/488

(Continued)

OTHER PUBLICATIONS

Wisniewski et al. "Application of bipolar electrodialysis to the recovery of acids and bases from water solutions" Desalination, 2004, 169(1): 11-20.*

*Primary Examiner* — Michael J Felton
*Assistant Examiner* — Katherine Will
(74) *Attorney, Agent, or Firm* — Fletcher Yoder, P.C.

(57) ABSTRACT

A system includes an ion separation unit that may receive dilute hydrochloric acid and may generate a concentrated hydrochloric acid and a chamber fluidly coupled to the ion separation unit. The chamber may receive the concentrated hydrochloric acid and may separate the concentrated hydrochloric acid into a liquid concentrated hydrochloric acid and a vapor containing vaporized hydrochloric acid. The system also includes a scrubber fluidly coupled to the chamber. The scrubber may receive the vapor from the chamber, and the scrubber is may remove at least a portion of the vaporized hydrochloric acid from the vapor via a purified condensate to generate a purified vapor and the dilute hydrochloric acid. The system also includes a condenser fluidly coupled to the scrubber The condenser may receive the purified vapor from the scrubber to condense the purified vapor into the purified condensate, and to output the purified condensate to the scrubber.

20 Claims, 4 Drawing Sheets

(51) Int. Cl.
    *C02F 1/469*     (2006.01)
    *C02F 1/52*      (2006.01)
    *C02F 103/08*    (2006.01)
    *B01D 1/28*      (2006.01)

(56) References Cited

U.S. PATENT DOCUMENTS

| | | | |
|---|---|---|---|
| 6,365,121 B1 * | 4/2002 | Wurmbauer | C01B 7/035 |
| | | | 423/150.3 |
| 6,482,305 B1 | 11/2002 | Mani | |
| 2011/0182786 A1 * | 7/2011 | Burba, III | C22B 3/02 |
| | | | 423/20 |
| 2011/0289846 A1 * | 12/2011 | Shaw | B01D 3/14 |
| | | | 48/202 |

* cited by examiner

HYDROCHLORIC ACID PRODUCTION SYSTEM

CROSS REFERENCE TO RELATED APPLICATION

This application benefits from the priority of U.S. Provisional Patent Application No. 61/817,076, entitled "System for Producing Concentrated Hydrochloric Acid," filed Apr. 29, 2013, which is hereby incorporated by reference in its entirety.

BACKGROUND

The subject matter disclosed herein generally relates to desalination systems, and more particularly, to a system for concentrating and recovering hydrochloric acid.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, innovative technologies and alternative water supplies for both drinking water and agriculture may be utilized. One method for obtaining an alternative source of potable water uses desalination systems to produce the potable water.

The desalination process may involve the removal of salts from seawater, agricultural run-off water, and/or brackish ground water brines to produce potable water. Membrane-based desalination may use an assortment of filtration methods, such as nanofiltration and reverse osmosis, to separate the raw brine stream into a desalinated water stream and a tailing stream. The tailing streams may contain various salts and other materials left over after the desalination process. Included in these tailing streams may be valuable salts and minerals which may be extracted using membrane-based and/or evaporative techniques.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system is provided. The system includes an ion separation unit that may receive dilute hydrochloric acid and may generate a concentrated hydrochloric acid and a chamber fluidly coupled to the ion separation unit. The chamber may receive the concentrated hydrochloric acid and may separate the concentrated hydrochloric acid into a liquid concentrated hydrochloric acid and a vapor containing vaporized hydrochloric acid. The system also includes a scrubber fluidly coupled to the chamber. The scrubber may receive the vapor from the chamber, and the scrubber is may remove at least a portion of the vaporized hydrochloric acid from the vapor via a purified condensate to generate a purified vapor and the dilute hydrochloric acid. The system also includes a condenser fluidly coupled to the scrubber The condenser may receive the purified vapor from the scrubber to condense the purified vapor into the purified condensate, and to output the purified condensate to the scrubber.

In a second embodiment, a system is provided. The system includes a water processing system that may desalinate water and may generate a brine discharge and a hydrochloric acid production system fluidly coupled to the water processing system. The hydrochloric acid production system includes an ion separation unit that may receive the brine discharge and dilute hydrochloric acid. The ion separation unit utilizes the brine discharge and the dilute hydrochloric acid to generate a concentrated hydrochloric acid. The hydrochloric acid production system also includes a chamber fluidly coupled to the ion separation unit. The chamber may remove water vapor from the concentrated hydrochloric acid to generate a liquid concentrated hydrochloric acid. The water vapor includes vaporized hydrochloric acid. The hydrochloric acid production system also includes a scrubber fluidly coupled to the chamber. The scrubber may receive the water vapor from the chamber and may separate the vaporized hydrochloric acid from the water vapor to generate a purified water vapor. The hydrochloric acid production system also includes a condenser fluidly coupled to the scrubber. The condenser may receive the purified water vapor, to condense the purified water vapor into a purified condensate, and to output the purified condensate to the scrubber to generate the dilute hydrochloric acid.

In a third embodiment, a method is provided. The method includes directing dilute hydrochloric acid to an ion separation unit, generating a concentrated hydrochloric acid from the dilute hydrochloric acid via the ion separation unit, routing the heated concentrated hydrochloric acid to a chamber, separating the concentrated hydrochloric acid into a liquid concentrated hydrochloric acid and a vapor including vaporized hydrochloric acid in the chamber, flowing the vapor to a scrubber fluidly coupled to the ion separation unit and to the chamber, removing at least a portion of the vaporized hydrochloric acid from the vapor to generate a purified vapor via the scrubber, condensing the purified vapor in a condenser fluidly coupled to the scrubber, and recirculating a condensed purified vapor to the scrubber. The condensed purified vapor recovers the vaporized hydrochloric acid from the scrubber to produce the dilute hydrochloric acid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
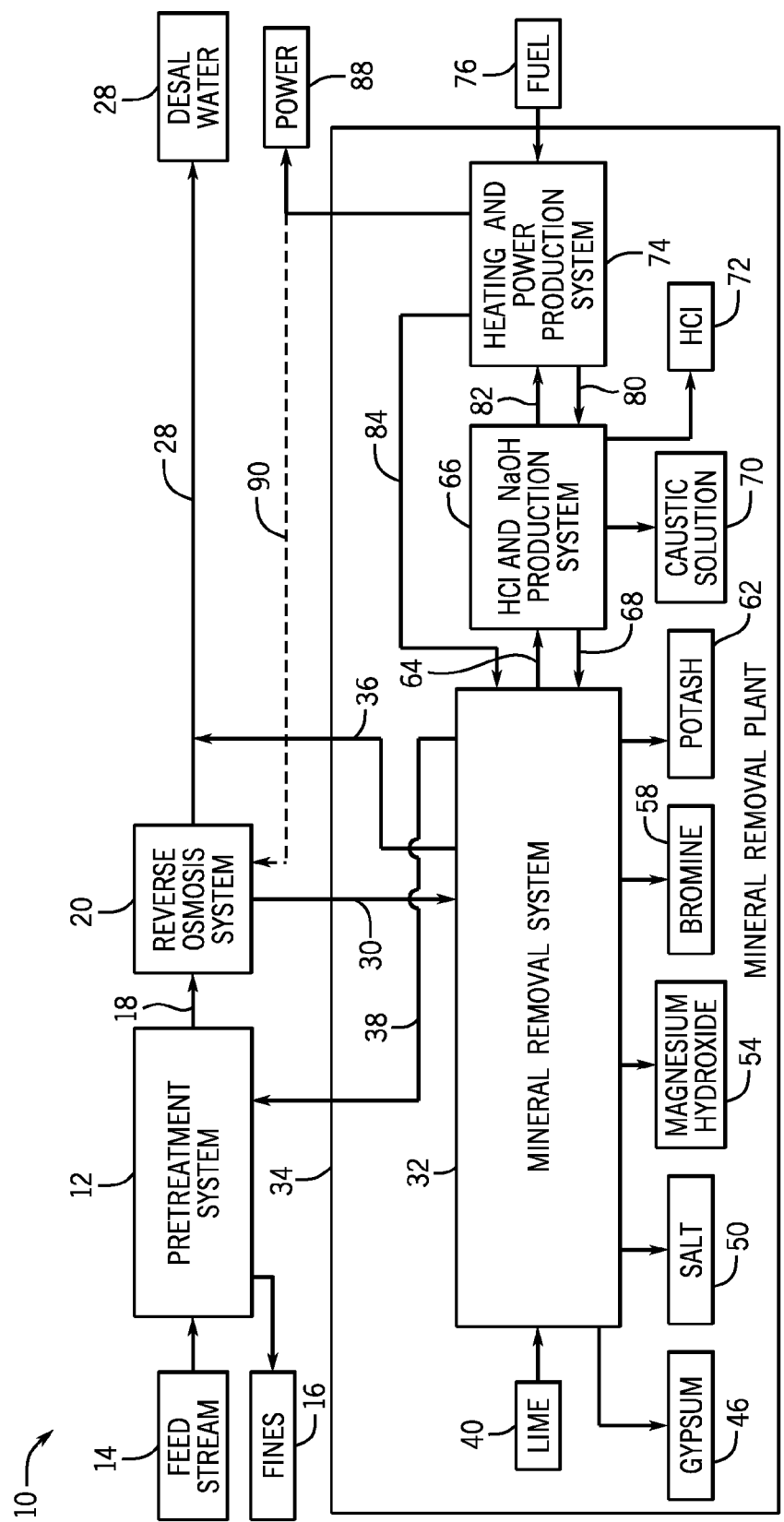
FIG. 1 is a block diagram of an embodiment of a water processing system, in accordance with aspects of the present disclosure.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a water processing system (e.g., desalination system) including a hydrochloric acid (HCl) concentration and recovery unit configured to produce and to direct a dilute hydrochloric acid solution (e.g., between approximately 0.5 to approximately 2 weight percent HCl) to an ion separation system, such as an electrodialysis bipolar membrane (EDBM), that utilizes the dilute hydrochloric acid solution to generate a concentrated hydrochloric acid. During desalination of water (e.g., seawater, agricultural run-off water, and/or brackish ground water brines), ion separation systems (e.g., EDBMs) are used to extract minerals from tailing streams that may otherwise be discarded. The ion separation systems may facilitate ion exchange and/or the enrichment of certain minerals. In certain configurations, the ion separation system may produce an HCl output solution having between approximately 4 to approximately 8 weight percent HCl. However, the HCl solutions having concentrations less than approximately 10 weight percent HCl may have a low commercial value (e.g., due to transportation costs). In contrast, concentrated HCl solutions (e.g., between approximately 10 to 33 weight percent HCl) may have a high commercial value. Unfortunately, attempts to produce a concentrated HCl solution from a dilute HCl solution have been cost prohibitive. For example, attempts to concentrate an HCl output solution by evaporating water from the HCl output solution may also remove HCl. As such, the concentration of HCl in the HCl output solution may be unchanged or decreased. Furthermore, certain systems may capture evaporated HCl using a base (e.g., a basic/caustic solution), thereby forming an undesirable salt byproduct. Accordingly, it may be desirable to provide an HCl production system that generates a commercially viable concentrated HCl solution.

FIG. 1 is a block diagram of an embodiment of a water processing system 10 that may benefit from the HCl production system. For example, the water processing system 10 may be part of a water desalination system, waste water treatment system, water purification system, oil and gas brine treating or any other suitable water processing system. In the illustrated embodiment, the water processing system 10 is used to produce desalinated water from a feed stream and to remove minerals from the feed stream. For example, the water processing system 10 may be used to produce high purity agricultural grade gypsum ($CaSO_4 \cdot 2H_2O$) (e.g., approximately greater than 97 wt % gypsum on a dry basis), industrial grade caustic (e.g., approximately greater than 97 wt % sodium hydroxide (NaOH) on a dry basis), industrial grade magnesium hydroxide (MgOH) (e.g., approximately greater than 98 wt % MgOH on an ignited basis, or on an ignited oxide basis) suitable for industrial magnesia refractory, industrial grade sodium chloride (NaCl) (e.g., approximately greater than 99.9 wt % NaCl on a dry basis), concentrated HCl for commercial use (e.g., approximately 10 wt % to 22 wt %), and/or desalinated water (e.g., approximately less than 1000 parts per million (ppm) total dissolved solids (TDS)) from underground brines, seawater desalination waste brines, and/or brackish water desalination waste brines. Furthermore, the water processing system 10 may use a combination of one or more of gypsum precipitation, magnesium hydroxide precipitation, electrodialysis (ED), and/or softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain NaCl, sulfate ($SO_4$), calcium (Ca), magnesium (Mg), and/or silicon dioxide (silica or $SiO_2$). In certain embodiments, the feed stream 14 may contain approximately 0.50 to 3.00 g/l NaCl, approximately 0.10 to 1.50 g/l $SO_4$, approximately 0.01 to 0.80 g/l Ca and Mg, and/or approximately 0.01 to 0.30 g/l $SiO_2$. Furthermore, in certain embodiments, the feed stream 14 may have a pH range between approximately 5 and 9. For example, the feed stream 14 may have a pH of approximately 8.

The pretreatment system 12 receives the feed stream 14 and removes solid materials (e.g., fines 16), such as iron (Fe) and manganese (Mn), from the feed stream 14. The pretreatment system 12 provides a pretreated feed stream 18 to a reverse osmosis (RO) system 20. The RO system 20 receives the pretreated feed stream 18 and produces a desalinated water stream 28. In certain embodiments, the desalinated water stream 28 may include $SiO_2$. Moreover, the desalinated water stream 28 may have a pH of approximately 7.5. Furthermore, the RO system 20 provides a brine stream 30 to a mineral removal system 32. In certain embodiments, the desalinated water stream 28 may be approximately 70 percent to approximately 90 percent of the output from the RO system 20, and the brine stream 30 may be approximately 10 percent to approximately 30 percent of the output from the RO system 20. For example, in some embodiments, the desalinated water stream 28 may be approximately 80 percent of the output from the RO system 20, and the brine stream 30 may be approximately 20 percent of the output from the RO system 20. As may be appreciated, while the illustrated embodiment uses the RO system 20, other embodiments may use NF in place of RO.

The mineral removal system 32 may be part of a mineral removal plant 34. The mineral removal plant 34 is configured to remove minerals, elements, and/or compounds from the brine stream 30. As may be appreciated, the brine stream 30 may be provided to the mineral removal plant 34 from any suitable source and/or system. In certain embodiments, the brine stream 30 may include substantial amounts of NaCl, sodium sulfate ($Na_2SO_4$), calcium (Ca), and/or magnesium (Mg). The mineral removal system 32 may provide one or more desalination streams 36 that include desalinated water (which may contain $SiO_2$). Furthermore, the one or more desalination streams 36 may include a disinfectant and/or oxidant. The disinfectant and/or oxidant may be provided to the pretreatment system 12 via a disinfectant stream 38.

A lime based material 40 (e.g., lime, quick lime, dolomitic lime, etc.) may be provided to the mineral removal system 32 to facilitate mineral removal from the brine stream 30. During operation, the mineral removal system 32 may be configured to remove any suitable minerals, elements, and/or compounds from the brine stream 30. For example, the mineral removal system 32 may provide a gypsum stream 46 (e.g., agricultural grade gypsum), a salt stream 50 (e.g., industrial grade sodium chloride), a magnesium hydroxide stream 54 (e.g., industrial grade magnesium hydroxide), a bromine stream 58, a potash stream 62, and/or any other mineral stream depending on the mineral content of the brine stream 30.

The mineral removal system 32 may generate additional streams that may be collected for commercial use and/or utilized in a downstream process of the water processing system 10. In certain embodiments, the mineral removal system 32 may provide one or more output streams 64 to a HCl and NaOH production system 66. For example, the mineral removal system 32 may provide a NaCl brine to the HCl and NaOH production system 66. As described in further detail below, the HCl and NaOH production system 66 may generate concentrated HCl via an ion separation process (e.g., EDBM process) and an HCl concentration process. Furthermore, the mineral removal system 32 may receive one or more input streams 68 from the HCl and NaOH production system 66. The one or more input streams 68 may provide the mineral removal system 32 with HCl and/or caustic (e.g., NaOH) produced by the HCl and NaOH production system 66. In addition, the HCl and NaOH production system 66 may provide a caustic solution 70 (e.g., NaOH) and/or a concentrated HCl product solution 72 that is not used by the mineral removal system 32 (e.g., produced to be sold).

The mineral removal plant 34 also includes a heating and power production system 74. The heating and power production system 74 may include a natural gas engine and/or a boiler. The heating and power production system 74 may be configured to receive a fuel 76. The fuel 76 may be any suitable fuel, such as natural gas, synthetic natural gas (e.g., syngas), or combination thereof. The heating and power production system 74 may provide power, steam, hot water, any suitable heated fluid, and so forth to the HCl and NaOH production system 66, as indicated by arrow 80. Moreover, the heating and power production system 74 may receive a cooled fluid stream 82 (e.g., cooled water) from the HCl and NaOH production system 66. As illustrated, the heating and power production system 74 may also provide power to the mineral removal system 32, as indicated by arrow 84. Additionally, the heating and power production system 74 may provide power 88 to another system and/or the RO system 20, as indicated by arrow 90.

Figure 2:
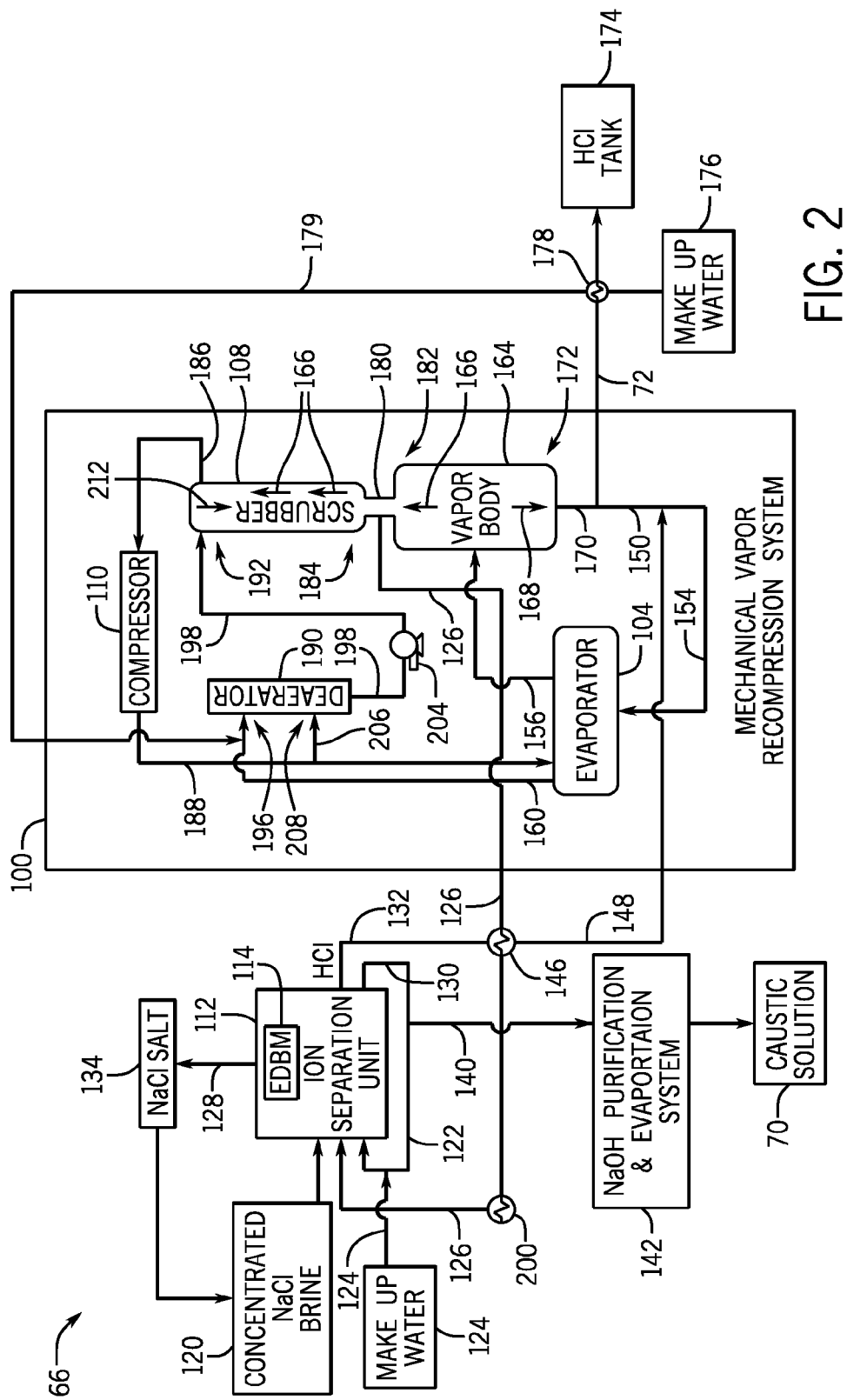
FIG. 2 is a block diagram of an embodiment of a hydrochloric acid (HCl) and sodium hydroxide (NaOH) production system that utilizes mechanical vapor recompression (MVR), in accordance with aspects of the present disclosure.

As discussed above, the HCl and NaOH production system 66 may recycle and concentrate HCl for commercial use. In one embodiment, the HCl and NaOH production system 66 recycles and concentrates HCl using a mechanical vapor recompression (MVR) evaporator system. In other embodiments, the HCl and NaOH production system 66 utilizes a vacuum condenser system to recycle and concentrate HCl. FIG. 2 is a block diagram of an embodiment of the HCl and NaOH production system 66, which is configured to concentrate HCl using an MVR evaporator system 100. The MVR system 100 includes an MVR evaporator 104 (e.g., condenser), an MVR scrubber 108, and a MVR compressor 110. The MVR system 100 is configured to concentrate an HCl output stream from an ion separation unit 112 and to provide a dilute HCl stream to the ion separation unit 112, as discussed in further detail below. The ion separation unit 112 may include an electrodialysis bipolar membrane (EDBM) 114 or other suitable membrane that facilitates separation of ions from a water source (e.g., the brine stream 30). By using the EDBM 114, or other similar membrane, to generate HCl (e.g., the concentrated HCl product solution 72), power consumption and capital costs associated with operation of the water processing system 10 may be decreased compared to systems that utilize other membranes (e.g., chlor-alkai membranes). In the illustrated embodiment, the ion separation unit 112 (e.g., the EDBM 114) receives a concentrated brine 120 (e.g., approximately 5 to 15 weight percent NaCl) from a process within the water processing system 10, e.g., the brine stream 30 from the RO system 20 and/or a brine stream recycled from the ion separation unit 112. In other embodiments, the ion separation unit 112 may receive the concentrated brine 120 from a brine make-up drum.

In addition to the concentrated brine 120, the ion separation unit 112 receives concentrated caustic (e.g., approximately 5 to 15 weight percent NaOH) and dilute HCl (e.g., between approximately 0.5 to 2 wt % HCl). For example, the ion separation unit 112 may receive the concentrated caustic from a NaOH make-up drum, a recycled NaOH stream 122 (e.g., recycled from the ion separation unit 112), or a combination thereof. In certain embodiments, the NaOH concentration of the recycled NaOH stream 122 may be adjusted to a suitable concentration for use in the ion separation unit 112 by adding make-up water 124. The ion separation unit 112 may also receive a recycled dilute HCl stream 126 (e.g., between approximately 1 to 3 weight percent HCl), as discussed in further detail below. The ion separation unit 112 is configured to separate the salt ions (e.g., $Na^+$ and $Cl^-$) and to split water molecules into proton (e.g., $H^+$) and hydroxide (e.g., $OH^-$) ions to produce a corresponding acid (e.g., HCl) and base (NaOH). Accordingly, the ion separation unit 112 may output a dilute NaCl stream 128 (e.g., approximately 3 to 5 weight percent NaCl), a NaOH output stream 130 (e.g., approximately 8 to 10 weight percent NaOH) and an HCl output stream 132 (e.g., approximately 5 to 7 weight percent HCl). As should be noted, the NaOH output stream 130 and the HCl output stream 132 are generated directly from the concentrated brine 120. The dilute NaCl stream 128 may be re-concentrated with NaCl salt 134 to produce the concentrated NaCl brine, which is recycled to the ion separation unit 112.

Similarly, the NaOH output stream 130 may be recycled to the ion separation unit 112. For example, in the illustrated embodiment, the NaOH output stream 130 is separated into the recycled NaOH stream 122 and a NaOH product stream 140. In use, the HCl and NaOH production system 66 may recycle between approximately 5 percent to approximately 10 percent of the NaOH output stream 130 to the ion separation unit 112 (e.g., via the recycled NaOH stream 122). In this way, conductivity within the ion separation unit 112 may be maintained, thereby facilitating separation of the salt ions (e.g., $Na^+$ and $Cl^-$). Recycling a portion of the NaOH output stream 130 may decrease an amount of NaOH make-up that may be used during operation of the water processing system 10, thereby decreasing operational costs. As discussed above, in certain embodiments, the make-up water 124 may be added to the recycled NaOH stream 122 to adjust the concentration of the recycled NaOH stream 122. In other embodiments, the make-up water 124 may not be added to the recycled NaOH stream 122. A non-recycled portion (e.g., the NaOH product stream 140) is directed to a NaOH purification and evaporation system 142 to generate the caustic solution 70 for commercial use.

As discussed above, the ion separation unit 112 also generates the HCl output stream 132. However, in certain embodiments, a concentration of HCl within the HCl output stream 132 may be less than desired (e.g., approximately less than 10 weight percent HCl) for commercial use. Accordingly, it may be beneficial to increase the HCl concentration in the HCl output stream 132 by between approximately 45 percent to approximately 86 percent to generate a cost effective concentrated HCl solution (e.g., approximately 15 to 22 weight percent HCl) that may be commercially viable. Accordingly, the HCl output stream 132 from the ion separation unit 112 is directed to the MVR system 100 for concentration. Prior to entering the MVR system 100, the HCl output stream 132 may be pre-heated via a first heat exchanger 146 (e.g., a graphite heat exchanger) to generate a pre-heated HCl stream 148. Positioning the first heat exchanger 146 between the ion separation unit 112 and the MVR system 100 may enable the ion separation unit 112 effluent (e.g., the HCl output stream 132), exiting the ion separation unit 112 at a temperature range of between approximately 30 to 60° C., to be pre-heated to between approximately 90 to 95° C. prior to entering the MVR evaporator 104, which maximizes MVR efficiency. In addition, the first heat exchanger 146 also facilitates cooling of an effluent (e.g., the recycled dilute HCl stream 126) exiting the MVR scrubber 108. For example, the MVR scrubber effluent may be cooled from a temperature of between approximately 95 to 110° C. to a temperature of between approximately 35 to 65° C., which reduces the amount of external cooling required to achieve a feed temperature (e.g., the recycled dilute HCl stream 126) of between approximately 30 to 60° C. In the illustrated embodiment, the pre-heated HCl stream 148 is directed toward a vapor body discharge stream 150. The pre-heated HCl stream 148 mixes with the vapor body discharge stream 150, thereby generating a combined HCl stream 154 before flowing into the MVR evaporator 104, as discussed in further detail below. In this way, the combined HCl stream 154 may flow through the MVR evaporator 104 at a velocity of between approximately 5 to 20 ft/s., thereby causing an increase in heat transfer within the MVR evaporator 104. Accordingly, the MVR evaporator 104 may be compact (e.g., small in size), thereby reducing the overall cost of the MVR evaporator 108 that may be associated with the use of expensive materials such as graphite. In certain embodiments, a ratio of the pre-heated HCl stream 148 to the vapor body discharge stream 150 may be between approximately 1:1 and approximately 1:10. However, any other suitable ratio of the pre-heated HCl stream 148 and the vapor body discharge stream 150 may be used.

In use, the MVR evaporator 104 receives and concentrates the combined HCl stream 154 by evaporating (e.g., removing) a portion of water from the combined HCl stream 154, producing a first two phase or heated HCl stream 156. While in the MVR evaporator 104, the combined HCl stream 154 may flow through a heat exchanger (e.g., a low pressure graphite heat exchanger) disposed within the MVR evaporator 104. As such, the combined HCl stream 154 may participate in heat transfer with pressurized steam (e.g., pressurized steam 188) from the compressor 110, as discussed in further detail below. In this way, the MVR evaporator 104 condenses the pressurized steam to generate an evaporator condensate 160. The evaporator condensate 160 may be used to recover HCl from the MVR scrubber 108, as will be discussed in further detail below. The MVR evaporator 104 directs the first two phase or heated HCl stream 156 to an MVR vapor body 164 (e.g., a chamber). The MVR vapor body 164 separates the first two phase or heated HCl stream 156 into a vapor stream 166 (e.g., water vapor and vaporized HCl) and HCl liquid 168, resulting in a concentrated HCl stream 170 (e.g., between approximately 15 to 25 wt % HCl) and the vapor stream 166. The MVR vapor body 164 may be manufactured from any suitable material (e.g., carbon steel, fiber reinforced plastic, etc.) and may include an anti-corrosive coating or a lining to protect the vapor body (e.g., chamber) and to block corrosion. For example, the MVR vapor body 164 may include polytetrafluoroethylene (e.g., Teflon®), perfluoroalkoxy alkanes (PFAs) liners, anti-corrosive coatings, or any other suitable protective material that mitigates HCl corrosion of the MVR vapor body 164.

The concentrated HCl stream 170 is extracted from an MVR vapor body bottom end 172. The concentrated HCl stream 170 is then separated into the vapor body discharge stream 150 and the concentrated HCl product solution 72. As discussed above, the vapor body discharge stream 150 is mixed with the pre-heated HCl stream 148 and directed to the MVR evaporator 104 to optimize heat transfer. The concentrated HCl product solution 72 is directed to an HCl product tank 174 (e.g., a storage tank) that stores the concentrated HCl product solution 72 for commercial use. The concentrated HCl product solution 72 is cooled by deionized make-up water 176 via an HCl product heat exchanger 178. The concentrated HCl product solution 72 provides heat to the deionized make-up water 176, thereby generating a heated makeup water 179 that may be utilized in other processes within the water processing system 10 and/or within the HCl and NaOH production system 66. In certain embodiments, both the vapor body discharge stream 150 and the concentrated HCl product solution 72 are directed toward the HCl product tank 174.

During concentration of the HCl liquid 168 in the MVR vapor body 164, the steam 166 separated from the HCl liquid 168 may contain vaporized HCl. For example, under the conditions (e.g., temperatures and pressures) within the MVR vapor body 164, certain concentrations of HCl in the first two phase or heated HCl stream 156 (e.g., above approximately 20 weight percent HCl) may form a mixture of between approximately 0.5 to 2 weight percent HCl and water vapor within the vapor stream 166. Therefore, to mitigate corrosive effects of HCl within the steam 166 the MVR scrubber 108 may be utilized to remove at least a portion of the HCl from the steam 166. As such, the steam 166 may be directed toward a throat 180 that couples a vapor body top end 182 to an MVR scrubber bottom end 184. Similar to the MVR vapor body 164, the MVR scrubber 108 may be manufactured from anti-corrosive materials (e.g., nickel-chromium alloys) and/or include anti-corrosive coatings to mitigate fouling of scrubber surfaces by the HCl. While in the MVR scrubber 108, HCl in the vapor stream 166 may be removed to generate a scrubber vapor stream 186 that contains residual HCl (e.g., approximately less than approximately 100 ppm). The MVR scrubber 108 may be a multi-stage low pressure drop absorber or distillation column configured to remove vaporized HCl and to purify the vapor stream 166. In certain embodiments, the MVR scrubber 108 may include packing material to facilitate removal (e.g., separation) of the vaporized HCl from the vapor stream 166. For example, the packing material may include polytetrafluoroethylene (PTFE) (e.g., Teflon®), polyvinylidene fluoride (PVDF), derivatives thereof, or any other suitable packing material that does not react with the vaporized HCl. In other embodiments, the MVR scrubber 108 may include trays (e.g., bubble-cap trays and/or valve-cap trays) to collect and to facilitate separation of the vaporized HCl and the vapor stream 166. By reducing the HCl concentration in the vapor stream 166, the scrubber vapor stream 186 may be used and processed with downstream equipment that is manufactured from less expensive materials (e.g., carbon steel, stainless steel) without resulting in undesired corrosion of the equipment. Accordingly, the operational costs of the water processing system 10 may be decreased due to decreased equipment and maintenance costs.

In one embodiment, the scrubber vapor stream 186 is routed to a compressor (e.g., the MVR compressor 110) that compresses the scrubber vapor stream 186 to generate a pressurized steam 188. Because the scrubber vapor stream 186 contains residual HCl (e.g., approximately less than 100 ppm HCl), corrosion of downstream equipment associated with HCl may be substantially reduced. Therefore, as discussed above, the MVR compressor 110 and other downstream equipment may be manufactured from less expensive materials. As illustrated in FIG. 2, the pressurized steam 188 is routed to the MVR evaporator 104. This may condense the stream 188 along with any residual HCl that may be present in the pressurized steam 188 exiting the MVR compressor 110. For example, as discussed above, the combined HCl stream 154 flows through a heat exchanger (e.g., a low pressure graphite heat exchanger) within the MVR evaporator 104. The first pressurized steam 188 and the combined HCl stream 154 may indirectly transfer heat. As such, residual HCl in the pressurized steam 188 may be condensed in the MVR evaporator and the residual HCl may flow out of the MVR evaporator 104 with the evaporator condensate 160. In other embodiments, the residual HCl may be neutralized upstream of the MVR evaporator 104 (e.g., the scrubber vapor stream 186 may undergo a neutralization process).

As discussed above, the evaporator condensate 160 may be used to recover HCl (e.g., vaporized HCl) separated from the steam 166 in the MVR scrubber 108. In certain embodiments, the evaporator condensate 160 is routed to a deaerator 190 that is fluidly coupled to an MVR scrubber top end 192. The heated makeup water 179 may be mixed with the evaporator condensate 160 prior to flowing into the deaerator 190. For example, in the illustrated embodiment, the evaporator condensate 160 is mixed with the heated makeup water 179 generated during cooling of the concentrated HCl product solution 72. The evaporator condensate 160 and the heated makeup water 179 flow into a deaerator top end 196 to generate a deaerated condensate 198 that is routed to the MVR scrubber top end 192 via pump 204. In certain embodiments, a pressurized steam portion 206 of the pressurized steam 188 may be routed to a deaerator bottom end 208 to facilitate removal of carbon dioxide ($CO_2$), air, and/or other gasses from the evaporator condensate 160 and the heated makeup water 179.

The deaerated condensate 198 flows through the MVR scrubber 108 in an opposing direction to the steam 166, as indicated by arrow 212. The deaerated condensate 198 and recovers the vaporized HCl separated from the steam 166, thereby generating the dilute HCl stream 124 (e.g., approximately 0.5 to 2 wt % HCl). For example, the deaerated condensate 198 may be used to scrub the vaporized HCl from the steam 166, thereby removing the HCl from the steam 166. As such, the scrubber vapor stream 186 may be purified, and the undesirable effects on downstream equipment associated with the HCl may be substantially reduced. The dilute HCl stream 124 flows out of the MVR scrubber bottom end 184 and may be directed to other processes of the water processing system 10 that may utilized the HCl. For example, in the illustrated embodiment, the dilute HCl stream 124 is directed to the ion separation unit 112. By recycling the dilute HCl stream 124 to the ion separation unit 112, the dilute stream 124 may be used to maintain conductivity within the ion separation unit 112 and to facilitate production of the HCl output stream 132. In this way, a portion of the HCl output stream 132 may not need to be recycled to the ion separation unit 112 to generate additional HCl (e.g., HCl output stream 132). Therefore the HCl and NaOH production system 66 may generate more concentrated HCl product solution 72 and the overall efficiency of the ion separation unit 112 may be increased, compared to systems that do not recycle vaporized HCl from the steam 166. In addition, the dilute HCl stream 124 may provide heat to other processes within the water processing system 10 and/or mineral removal plant 34. For example, in the illustrated embodiment, the dilute HCl stream 124 heats the HCl output stream 132 via the first heat exchanger 146. Thereafter, the dilute HCl stream 124 may be further cooled by a second heat exchanger 216 (e.g., a water cooler) before flowing into the ion separation unit 112, to block thermal damage to the membranes in the ion separation unit 112.

Figure 3:
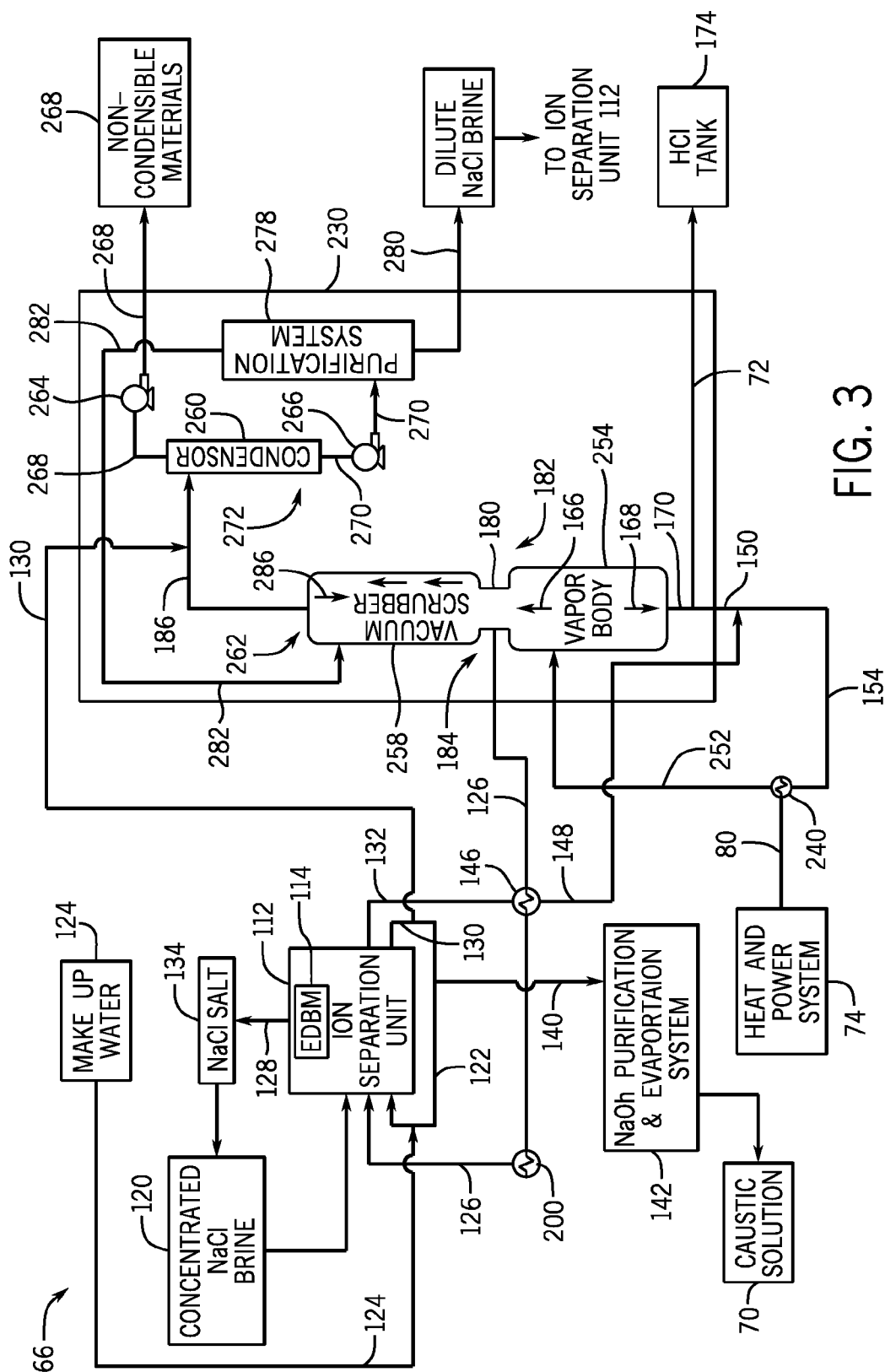
FIG. 3 is a block diagram of an embodiment of a hydrochloric acid (HCl) and sodium hydroxide (NaOH) production system that utilizes a vacuum condenser, in accordance with aspects of the present disclosure.

As noted above, the mineral recovery system 32 may utilize a vacuum condenser system to recycle and concentrate HCl for commercial use. FIG. 3 is a block diagram of an embodiment of the mineral recovery unit 32 configured to generate the concentrated HCl product solution 72 using a vacuum condenser system 230. Similar to the embodiment described in FIG. 2, the HCl output stream 132 is generated by the ion separation unit 112 and combined with the vapor body discharge stream 150, forming the combined HCl stream 154. The combined HCl stream 154 flows through a third heat exchanger 240 (e.g., a graphite plate and frame heat exchanger) fluidly coupled to the heat and power production system 74. The heat and power production system 74 provides the heated fluid 80 (e.g., water), to the heat exchanger 140 to heat the combined HCl stream 154, thereby generating a second two phase or heated HCl stream 252. The second two phase or heated HCl stream 252 is then directed to a vacuum vapor body 254. The vacuum vapor body 254 may operate at a temperature range of between approximately 35° C. to approximately 80° C. and a pressure range of approximately 0.5 psia to approximately 5 psia. The operational conditions (e.g., temperature and pressure) of the vacuum vapor body 254 may facilitate removal of the steam 166 and concentration of the HCl in the second two phase or heated HCl stream 252 to form the HCl liquid 168.

Similar to the embodiment described in FIG. 2, the steam 166 is directed into a vacuum scrubber 258 to remove vaporized HCl, thereby purifying the steam 166 and generating the scrubber vapor stream 186, as described above with reference to FIG. 2. As should be noted, the vacuum scrubber 258 may be manufactured from anti-corrosive materials (e.g., nickel-chromium alloys) and/or may include anti-corrosive coatings to reduce fouling of vacuum scrubber surfaces from the HCl. The scrubber vapor stream 186 is directed to a vacuum condenser 260 for further processing. For example, the scrubber vapor stream 186 may flow into the vacuum condenser 260 that is fluidly coupled to a vacuum scrubber top end 262. In certain embodiments, caustic (e.g., the NaOH output stream 130) is added to the scrubber vapor stream 186 upstream of the vacuum condenser 260. The caustic may neutralize any residual HCl that may be in the scrubber vapor stream 186. Because the HCl has been removed from the scrubber vapor stream 186, equipment downstream of the vacuum scrubber 258 (e.g., the vacuum condenser 260) may not be susceptible to fouling (e.g., corrosion), and therefore, may be manufactured from less expensive materials (e.g., stainless steel). For example, the vacuum condenser 260 may be a standard surface condenser (e.g., a steam turbine surface condenser) or any other suitable vacuum condenser. The vacuum condenser 260 may be supplied with a cooled fluid (e.g., water and/or air) to maintain a condenser temperature range of approximately 25° C. to approximately 40° C. and to facilitate condensation of the scrubber vapor stream 186.

The vacuum condenser system 230 may also include a vacuum pump 264 (e.g., a liquid ring vacuum pump) and a condensate pump 266. The vacuum pump 264 establishes a vacuum pressure (e.g., between approximately 0.5 psia to approximately 5 psia) within the vacuum condenser system 230, thereby removing non-condensable materials 268 (e.g., air) from the vacuum condenser 260. The condensate pump 266 may facilitate removal of a second condensate 270 (e.g., condensed steam) from a condenser bottom 272. The second condensate 270 is purified in a purification system 278 (e.g., an electrodeionization unit) to remove NaCl that may have been formed during neutralization of the scrubber vapor stream 186. Accordingly, the purification system 278 generates a second dilute NaCl output stream 280 and a vacuum condenser condensate 282. In certain embodiments, the second dilute NaCl output stream 280 may be combined with the first NaCl output stream 128 and recycled to the ion separation unit 112, as described above. Similar to the deaerated condensate 198 discussed above, the vacuum condenser condensate 282 is routed to the vacuum scrubber top end 262 and circulated through the vacuum scrubber 258, as indicated by arrow 286. While in the vacuum scrubber 258, the vacuum condenser condensate 282 scrubs the steam 166 and generates the dilute HCl stream 124, which is directed to the ion separation unit 112, as discussed above with reference to FIG. 2.

Figure 4:
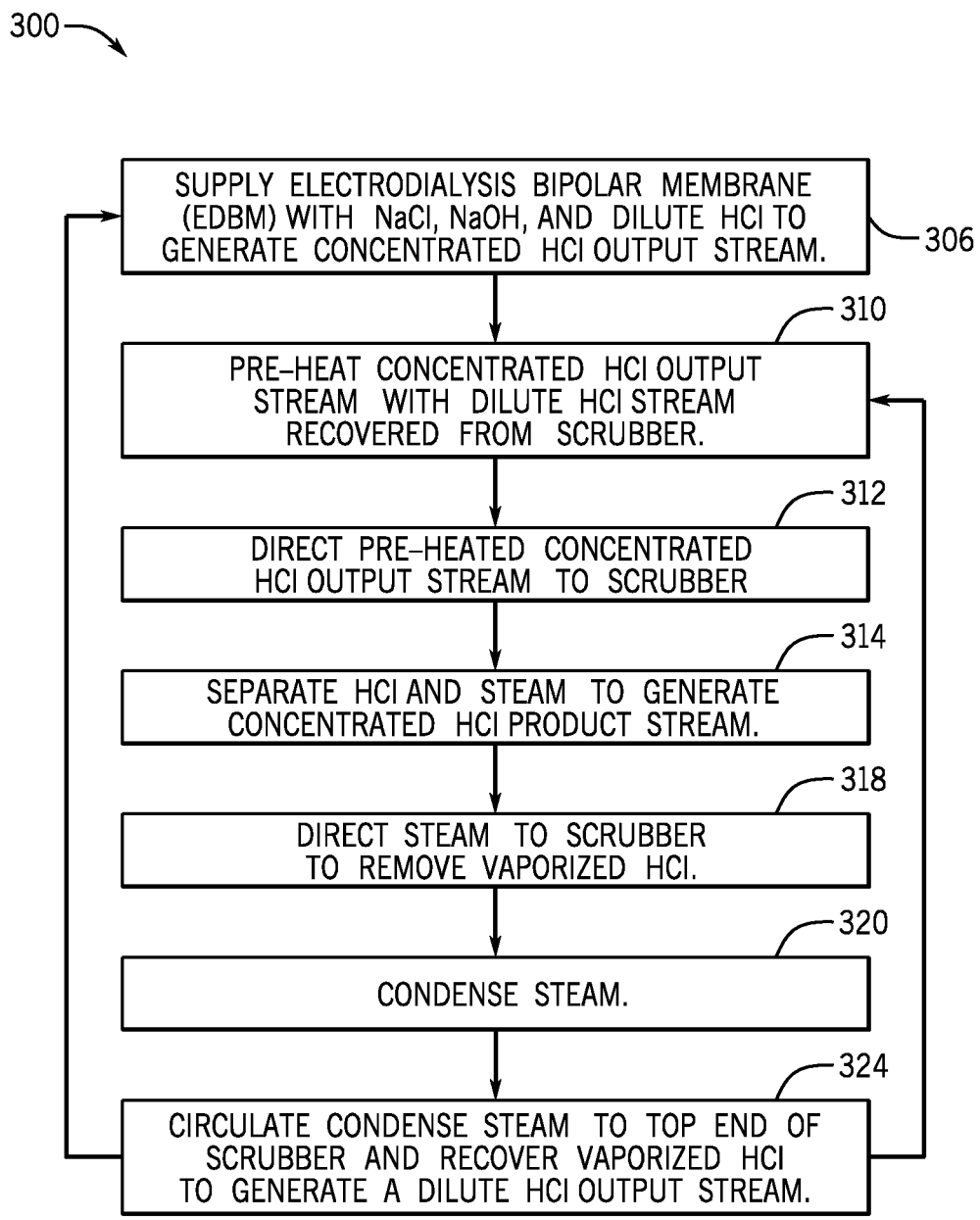
FIG. 4 is a flow diagram of an embodiment of a method for generating concentrated and dilute HCl using the HCl

Present embodiments also include a method that utilizes the mineral recovery system 32 to concentrate an HCl output stream (e.g., HCl output stream 132) from an EDBM (e.g., EDBM 114) and to recirculate a dilute HCl stream (e.g., the dilute HCl stream 124) recovered from a scrubber (e.g., the MVR scrubber 108 or vacuum scrubber 258). The dilute HCl stream is directed to the EDBM 114 to maintain conductivity in the EDBM 114 for HCl production. FIG. 4 is a flow diagram of a method 300 by which a mineral recovery system (e.g., the mineral recovery system 32 described above) may generate concentrated HCl (e.g., the concentrated HCl product solution 72) and recover vaporized HCl (e.g., dilute HCl stream 124). In certain embodiments, the mineral recovery system 32 utilizes an MVR system (e.g., MVR system 100) to concentrate and recover HCl. In other embodiments, the mineral recovery system 32 utilizes a vacuum condenser system (e.g., the vacuum condenser system 230). The method 300 includes supplying the ion separation unit 112 with concentrated NaCl brine (e.g., NaCl brine 120), NaOH (e.g., recycled NaOH stream 124), and dilute HCl (e.g., recycled dilute HCl 126) to generate a concentrated HCl stream (e.g., the HCl output stream 132) (block 306), as described above with reference to FIGS. 2 and 3. The NaOH and HCl supplied to the ion separation unit 112 maintain the conductivity of the ion separation unit 112, thereby facilitating production of HCl (e.g., generating the HCl output stream 132 having a concentration of between approximately 4 to 8 weight percent HCl).

The method 300 also includes pre-heating the HCl output stream 132 with the dilute HCl stream (e.g., recycled dilute HCl stream 126) recovered from the scrubber (e.g., MVR scrubber 108 or vacuum scrubber 258) (block 310) and directing the pre-heated HCl output stream (e.g., pre-heated HCl output stream 148) to a vapor body (e.g., the MVR vapor body 164 or vacuum vapor body 254) (block 312). In certain embodiments, the pre-heated HCl output stream 148 flows through an MVR evaporator (e.g., MVR evaporator 104) that removes (evaporates) a portion of the water in an HCl combined stream (e.g., the HCl combined stream 154) and increases the concentration of HCl. For example, the MVR evaporator 104 may increase the HCl concentration in the combined HCl stream 154 from between approximately 4 to 8 wt % HCl to between approximately 10 to 20 wt % HCl. The combined HCl stream 154 may also flow through a heat exchanger (e.g., within the MVR evaporator 104 or the third heat exchanger 240). In one embodiment, the combined HCl stream 154 provides heat to a pressurized steam (e.g., the pressurized steam 188) from the MVR compressor 110 to remove any residual HCl that may within the scrubber vapor stream 186. In addition, flowing the combined HCl stream 154 through a heat exchanger may drive separation of the HCl liquid 168 and steam 166 in the vapor body (e.g., the MVR or vacuum vapor bodies 164 and 254, respectively). As such, the amount of power used to concentrate the HCl in the vapor body may be decreased.

The method further includes separating the HCl (e.g., HCl liquid 168) and steam (e.g., the steam 166) to generate the concentrated HCl stream 170 (block 314). The concentrated HCl stream 170 may be routed to the HCl storage tank 174 (e.g., the concentrated HCl product solution 72) for commercial use. In certain embodiments, a portion of the concentrated HCl stream 170 (e.g., vapor body discharge stream 150) may be mixed with the pre-heated HCl stream 148 to increase the flow rate of the combined HCl stream 154 through the heat exchanger (e.g., the MVR evaporator 104 or the third heat exchanger 240) and maximize heat transfer, minimizing evaporator costs.

The method also includes separating the vaporized HCl from the steam 166 to generate THE scrubber vapor stream 186 (block 318), and condensing the scrubber vapor stream 186 (e.g., in MVR compressor 110 or vacuum condenser 260) (block 320). Accordingly, the possibility of fouling equipment downstream of the scrubber (e.g., due to corrosion) may be substantially reduced. Therefore, less expensive equipment (e.g., compressors, deaerators, and condensers) may be utilized downstream of the scrubber (e.g., the MVR scrubber 108 and vacuum scrubber 258). The method further includes directing the condensed steam (e.g., the evaporator condensate 160 or the vacuum condenser condensate 282) to the scrubber (e.g., MVR scrubber top end 192 or vacuum scrubber top end 262, respectively) to recover vaporized HCl and generate a dilute HCl stream (e.g., the recycled dilute HCl stream 126) (block 324). In certain embodiments, the pressurized steam (e.g., the pressurized steam 188) from the MVR compressor 110 is directed to the MVR evaporator 104 to condense the steam and residual HCl that may be within the stream prior to flowing the stream toward the MVR scrubber top end 192.

In other embodiments, the residual HCl may be neutralized prior to condensation of the scrubber vapor steam 186 and/or the pressurized steam 188. In this way, the vaporized HCl in the scrubber may be recovered and recycled to the EDBM 114 (e.g., the ion separation unit 112). The recycled dilute HCl stream 126 may facilitate formation of the HCl output stream 132 by maintaining the desired conductivity within the ion separation unit 112 (e.g., the EDBM 114).

As described above, certain embodiments of the water processing system 10 may produce a concentrated HCl (e.g., between approximately 10 to approximately 22 wt % HCl) for commercial use. The water processing system 10 may recover vaporized HCl, thereby substantially reducing the possibility of corrosion of downstream equipment (e.g., the MVR compressor 110 and vacuum condenser 260). As such, the water processing system 10 may utilize equipment manufactured from less expensive material (e.g., carbon steel, stainless steel), thereby reducing the overall equipment and operational costs of the water processing system 10. Moreover, by recovering the vaporized HCl and recycling it to the ion separation unit 112 (e.g., via the recycled dilute HCl stream 126), the desired conductivity in the ion separation unit 112 may be maintained. In addition, HCl output (e.g., the HCl output stream 132) may not need to be recycled to the ion separation unit 112. As such, the overall efficiency of the HCl and NaOH production system may be increased.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
    an ion separation unit configured to receive dilute hydrochloric acid and to generate a concentrated hydrochloric acid;
    a chamber fluidly coupled to the ion separation unit, wherein the chamber is configured to receive the concentrated hydrochloric acid via a first flow path fluidly coupled to the chamber and to the ion separation unit, and the chamber is configured to separate the concentrated hydrochloric acid into a liquid concentrated hydrochloric acid and a vapor containing vaporized hydrochloric acid;
    a scrubber fluidly coupled to the chamber and to the ion separation unit, wherein the scrubber is configured to receive the vapor from the chamber, and the scrubber is configured to remove at least a portion of the vaporized hydrochloric acid from the vapor to generate a purified vapor and the dilute hydrochloric acid, wherein a second flow path, separate from the first flow path, is configured to direct the dilute hydrochloric acid from the scrubber to the ion separation unit; and
    a condenser fluidly coupled to the scrubber, wherein the condenser is configured to receive the purified vapor from the scrubber, to condense the purified vapor into a purified condensate, and to output the purified condensate to the scrubber via a third flow path, separate from the first and the second flow paths.

2. The system of claim 1, wherein the ion separation unit comprises an electrodialysis bipolar membrane (EDBM) unit configured to produce the concentrated hydrochloric acid.

3. The system of claim 1, comprising a first heat exchanger fluidly coupled to the ion separation unit and to the chamber, wherein the first heat exchanger is configured to transfer heat to the concentrated hydrochloric acid.

4. The system of claim 1, comprising a compressor fluidly coupled to the scrubber and to the condenser, wherein the compressor is configured to receive the purified vapor from the scrubber, to compress the purified vapor to produce a pressurized steam, and to output the pressurized steam to the condenser.

5. The system of claim 4, wherein the condenser comprises a second heat exchanger fluidly coupled to the chamber, wherein the second heat exchanger is configured to receive the pressurized steam and the concentrated hydrochloric acid, to transfer heat from the pressurized steam to the concentrated hydrochloric acid, to output the concentrated hydrochloric acid to the chamber and to condense the pressurized steam into the purified condensate.

6. The system of claim 1, comprising a deaerator fluidly coupled to the condenser and to the scrubber, wherein the deaerator is configured to receive the purified condensate from the condenser, to remove air from the purified condensate, and to provide the purified condensate to the scrubber.

7. The system of claim 1, wherein the condenser comprises a vacuum condenser.

8. A system, comprising:
    a water processing system configured to desalinate water and to generate a brine discharge;
    a hydrochloric acid production system fluidly coupled to the water processing system, wherein the hydrochloric acid production system comprises:
        an ion separation unit configured to receive the brine discharge and dilute hydrochloric acid, wherein the ion separation unit, in operation, utilizes the brine discharge and the dilute hydrochloric acid to generate a concentrated hydrochloric acid;
        a chamber fluidly coupled to the ion separation unit and configured to receive the concentrated hydrochloric acid from the ion separation unit via a first flow path, wherein the chamber is configured to remove water vapor from the concentrated hydrochloric acid to generate a liquid concentrated hydrochloric acid, wherein the water vapor comprises vaporized hydrochloric acid;
        a scrubber fluidly coupled to the chamber and to the ion separation unit, wherein the scrubber is configured to receive the water vapor from the chamber and to separate the vaporized hydrochloric acid from the water vapor to generate a purified water vapor and the dilute hydrochloric acid;
        a condenser fluidly coupled to the scrubber, wherein the condenser is configured to receive the purified water vapor from the scrubber via a second flow path, separate from the first flow path, to condense the purified water vapor into a purified condensate, and to output the purified condensate to the scrubber via a third flow path, separate from the first and second flow paths, to generate the dilute hydrochloric acid.

9. The system of claim 8, comprising a first heat exchanger fluidly coupled to the ion separation unit and to the scrubber, wherein the first heat exchanger is configured to transfer heat from the dilute hydrochloric acid to the concentrated hydrochloric acid.

10. The system of claim 8, wherein the ion separation unit comprises an electrodialysis bipolar membrane (EDBM).

11. The system of claim 8, comprising a compressor fluidly coupled to the scrubber and to the condenser, wherein the compressor is configured to receive the purified water vapor from the scrubber, to compress the purified water vapor to produce a pressurized steam, and to output the pressurized steam to the condenser.

12. The system of claim 11, wherein the condenser comprises a second heat exchanger fluidly coupled to the chamber, wherein the second heat exchanger is configured to receive the pressurized steam and the concentrated hydrochloric acid, to transfer heat from the pressurized steam to the concentrated hydrochloric acid, to output the concentrated hydrochloric acid to the chamber and to condense the pressurized steam into the purified condensate.

13. The system of claim 8, wherein the purified condensate flows through the scrubber in a first direction, the purified water vapor flows through the scrubber in a second direction, opposite the first direction, such that the dilute hydrochloric acid exits through a scrubber bottom end, and the purified water vapor exits through a scrubber top end, and wherein the scrubber bottom end is fluidly coupled to the ion separation unit.

14. The system of claim 8, comprising a storage tank fluidly coupled to the chamber, wherein the storage tank receives at least a portion of the liquid concentrated hydrochloric acid.

15. The system of claim 8, wherein at least a portion of the liquid concentrated hydrochloric acid is combined with the concentrated hydrochloric acid upstream of the condenser.

16. A method, comprising:
directing dilute hydrochloric acid to an ion separation unit;
generating a concentrated hydrochloric acid from the dilute hydrochloric acid via the ion separation unit;
routing the concentrated hydrochloric acid to a chamber;
separating the concentrated hydrochloric acid into a liquid concentrated hydrochloric acid and a vapor containing vaporized hydrochloric acid in the chamber;
flowing the vapor to a scrubber fluidly coupled to the ion separation unit and to the chamber;
recirculating at least a portion of the liquid concentrated hydrochloric acid to the chamber;
removing at least a portion of the vaporized hydrochloric acid from the vapor to generate a purified vapor and the dilute hydrochloric acid via the scrubber;
condensing the purified vapor in a condenser fluidly coupled to the scrubber, and recirculating a condensed purified vapor to the scrubber, wherein the condensed purified vapor recovers the vaporized hydrochloric acid from the scrubber to produce the dilute hydrochloric acid provided to the ion separation unit.

17. The method of claim 16, comprising heating the concentrated hydrochloric acid in a heat exchanger disposed downstream of the ion separation unit.

18. The method of claim 17, comprising directing the dilute hydrochloric acid from the scrubber to the heat exchanger and transferring heat from the dilute hydrochloric acid to the concentrated hydrochloric acid from the ion separation unit to pre-heat the concentrated hydrochloric acid.

19. The method of claim 17, combining a first portion of the liquid concentrated hydrochloric acid with the concentrated hydrochloric acid upstream of the chamber and flowing the combined stream to the chamber.

20. The method of claim 16, comprising directing a second portion of the liquid concentrated hydrochloric acid to a product storage tank.

* * * * *